United States Patent [19]

Seita et al.

[11] Patent Number: 5,094,749
[45] Date of Patent: Mar. 10, 1992

[54] KNURLED SHEETLIKE PERMEABLE MEMBRANE, FOR PRODUCTION THEREOF, AND BODY FLUID FILTERING APPARATUS

[75] Inventors: Yukio Seita; Shoichi Nagaki; Shinichiro Kuroda, all of Fuji, Japan

[73] Assignee: Terumo Kabushiki Kaisha, Tokyo, Japan

[21] Appl. No.: 445,670

[22] PCT Filed: May 30, 1988

[86] PCT No.: PCT/JP88/00529
§ 371 Date: Jan. 23, 1990
§ 102(e) Date: Jan. 23, 1990

[87] PCT Pub. No.: WO88/09200
PCT Pub. Date: Dec. 1, 1988

[30] Foreign Application Priority Data

May 29, 1987 [JP] Japan .................. 62-131792
Sep. 8, 1987 [JP] Japan .................. 62-224622

[51] Int. Cl.⁵ ............................. F01D 61/18
[52] U.S. Cl. ................. 210/321.75; 210/321.84
[58] Field of Search ................. 210/232, 224-231, 210/321.6, 321.64, 321.72, 321.75, 321.76, 321.84, 321.85

[56] References Cited

U.S. PATENT DOCUMENTS 4,597,868  7/1986  Watanabe .................. 210/232

Primary Examiner—Frank Sever
Attorney, Agent, or Firm—Burns, Doane, Swecker & Mathis

[57] ABSTRACT

A sheetlike permeable membrane is characterized by being provided on at least one surface thereof with a plurality of minute protuberances. When a plurality of such sheetlike permeable membranes are incorporated as superposed in a modular structure, the minute projections on the surfaces of these permeable membranes form a stable and proper body fluid flow path between the adjacent permeable membranes and permit dimensional reduction of the modular structure and impart improved performance thereto. Thus, the permeable membranes are suitable for use in such body fluid filtration apparatus as blood plasma separation apparatus.

29 Claims, 8 Drawing Sheets

KNURLED SHEETLIKE PERMEABLE MEMBRANE, FOR PRODUCTION THEREOF, AND BODY FLUID FILTERING APPARATUS

BACKGROUND OF THE INVENTION

1. [Field of the Invention]

This invention relates to a sheetlike permeable membrane, a method for the production thereof, and a body fluid filtering apparatus. More particularly, this invention relates to a sheetlike permeable membrane used for dialysis, ultrafiltration, precision filtration, etc., which sheetlike permeable membrane, when it is incorporated in a modular structure, for example, permits ready formation of a stable flow path for a liquid under treatment, a method for the production of the sheetlike permeable membrane, and a body fluid filtering apparatus using the sheetlike permeable membrane.

2. [Description of the Prior Art]

Nowadays various kinds of macromolecular permeable membranes are used in physical and chemical operations of separation such as dialysis, ultrafiltration, and precision filtration, for example. Generally, macromolecular compounds are the most suitable materials for such membranes. Macromolecular permeable membranes, however, are susceptible of deformation. When a sheetlike permeable membrane is incorporated in a modular structure, for example, the deformation renders it difficult for the permeable membrane to retain stably a prescribed flow path for a liquid under treatment.

As a solution for this problem, there has been proposed a sheetlike permeable membrane which, prior to its incorporation in a modular structure such as of a blood plasma separation apparatus, is provided on one surface thereof with a body fluid flow path regulating plate possessed of a jogging surface and which is claimed to form a body fluid flow path in a thickness of high accuracy and manifest a satisfactory ability to separate blood plasma [Japanese Patent Application Unexamined Disclosure SHO 57(1982)-25,857]. In the blood plasma separation apparatus as illustrated in FIG. 11, for example, inside a case comprising cylindrical case proper 54 provided in the central part of the top plate thereof with a body fluid inlet 51, in the peripheral part of the top plate thereof with blood plasma outlets 52, and in the lateral wall thereof with blood fluid outlet 53 and a bottom lid member 56 fitted along the peripheral edge thereof with an O ring 55, a plurality of permeable membrane units 61 each formed by interposing a filtrate flow path forming plate 57 of screen mesh between two vertically opposed sheetlike permeable membranes 50a, 50b, sealing the peripheral edges thereof and the peripheral edge part of a central open part 58, and attaching a sealing material 60 fast to the outer periphery of a filtrate passing hole 59 are superposed as separated by the intervention of a body fluid flow path regulating plate 62 provided with the central open part 58 and the filtrate passing hole 59 opposed to the permeable membrane unit 61 and further provided on the opposed surfaces thereof with a multiplicity of protuberances, and body fluid flow path regulating plates 63 each provided with the central open part 58 and the filtrate passing hole 59 opposed to the permeable membrane unit 61 and further provided on one surface thereof with a multiplicity of protuberances are severally interposed between the upper surface of the uppermost of the permeable membrane units 61 and the upper inner surface of the case and between the lower surface of the lowermost of the permeable membrane units and the bottom inner surface of the case.

In order that the conventional sheetlike permeable membranes may be allowed as described above to form a flow path for a liquid under treatment in a modular structure, for example, it is necessary that mesh plates such as the filtrate flow path forming plates 57 and dotted plates such as the body fluid flow path regulating plates 62, 63 should intervene as spacers between the permeable membranes as in the blood plasma separation apparatus illustrated in FIG. 11. When they are superposed in a multiplicity of layers, therefore, they entail a disadvantage that the modular structure occupies a large space, the assembly of the structure calls for a complicated process, and the priming volume is unduly large.

As a field of utility of the technique of blood plasma separation, the collection of blood plasma from healthy normal person (donor plasma phasis) is attracting attention in these days in addition to the therapy in which the technique has been in popular utility to date. This trend of the technique has been urging development of blood plasma separation apparatuses of smaller dimensions and higher performance.

An attempt at attaining a dimensional reduction in the apparatus proposed as described above requires the thickness of the body fluid flow path regulating plate to be decreased to the fullest possible extent to which the function thereof is not impaired. Because of the limit (approximately 700 to 800 μm) attendant upon the technique available generally today, the dimensional reduction of the apparatus has its own limit. The body fluid flow path in the proposed apparatus mentioned above is formed as interposed between the blood flow path regulating plates 62, 63 and the permeable membranes 50a, 50b as illustrated in FIG. 12. Because of the possibility that the protuberances on the body fluid flow path regulating plate deform the permeable membranes and impart irregularity to the blood flow path as illustrated in FIG. 13, there arises a problem that the permeable membranes are not necessarily allowed to manifest fully the ability of permeation of its own.

An object of this invention, therefore, is to provide a novel sheetlike permeable membrane, a method for the production thereof, and a body fluid filtering apparatus. Another object of this invention is to provide a sheetlike permeable membrane which, on incorporation in a modular structure, permits easy formation of a stable flow path for a liquid under treatment and manifests a distinct ability to filter body fluid and a method for the production thereof. A further object of this invention is to provide a sheetlike permeable membrane which, on incorporation in a modular structure, permits dimensional reduction of modules, simplification of the process of assembly, and reduction in the priming volume, a method for the production thereof, and a body fluid filtering apparatus using the sheetlike permeable membrane.

[DISCLOSURE OF THE INVENTION]

The objects described above are accomplished by a sheetlike permeable membrane characterized by being provided on at least one surface thereof with a plurality of minute protuberances.

This invention further discloses a sheetlike permeable membrane wherein the height of the minute protuberances is in the range of 20 to 1,000 μm and the area occupied by the potions of the protuberances is in the range of 0.5 to 50%, based on the area of the surface provided with the minute protuberances. This invention further discloses a sheetlike permeable membrane wherein the portions of the minute protuberances are made of the same material as the main body of the permeable membrane. This invention further discloses a permeable membrane wherein the portions of the minute protuberances are made of a material different from the material of the main body of the permeable membrane. This invention further discloses a permeable membrane wherein the main body of the permeable membrane and the portions of the minute protuberances are made of a macromoelcular substance selected from the group consisting of regenerated cellulose type, cellulose derivative type, polyvinyl alcohol type, polysulfon type, poly(methy)acryl type, polyamide type, and polyolefin type substances. This invention further discloses a permeable membrane wherein the main body of the permeable membrane and the portions of the minute protuberances are made of polypropylene. This invention further discloses a permeable membrane wherein the main body of the permeable membrane is made of a macromolecular substance selected from the group consisting of regenerated cellulose type, cellulose derivative type, polyvinyl alcohol type, polysulfon type, poly(meth)acryl type, polyamide type, and polyolefin type substances and the portions of the minute protuberances are made of a thermoplastic resin, a thermosetting or an electromagnetic wave-setting resin, or a synthetic resin compatible with or adhesive to the material of which the main body of the permeable membrane is made. This invention further discloses a permeable membrane wherein the main body of the permeable membrane is made of polypropylene and the portions of the minute protuberances are made of polyurethane, epoxy resin, or an acrylic ester resin. This invention further discloses a permeable membrane wherein the average pore diameter is in the range of 0.01 to 5 μm. This invention also discloses a sheetlike permeable membrane which is used as a membrane for blood plasma separation.

The objects described above are also accomplished by a method for the production of a sheetlike permeable membrane by the coagulation of a dope formed in a sheetlike shape, which method is characterized by allowing the coagulation of the dope in the sheetlike shape to proceed while keeping at least one surface of the sheetlike mass of the dope in contact with a mold surface provided with a plurality of minute depressions thereby effecting formation of as many minute protuberances on at least one surface of the produced permeable membrane as the depressions.

This invention further discloses a method for the production of a sheetlike permeable membrane, wherein the minute depressions in the mold to be used are such that the depth of the depressions is in the range of 20 to 1,000 μm and the area occupied by the portions of the minute depressions is in the range of 0.5 to 50%, based on the area of the mold surface. This invention further discloses a method for the production of a sheetlike permeable membrane, wherein the mold surface provided with the plurality of minute depressions is a roller surface.

The objects described above are accomplished further by a method for the production of a sheetlike permeable membrane, characterized by placing in contact with at least one surface of a permeable membrane formed in a sheetlike shape a mold surface produced by casting in the state of dough a material compatible with or adhesive to the material forming the permeable membrane and provided with a plurality of minute depressions, coagulating the dough in situ, and thereby forming as many minute protuberances on the one surface of the permeable membrane as the depressions.

This invention further discloses a method for the production of a sheetlike permeable membrane, wherein the minute depressions in the mold to be used are such that the depth of the depressions is in the range of 20 to 1,000 μm and the area occupied by the portions of the minute depressions is in the range of 0.5 to 50 %, based on the area of the mold surface. This invention further discloses a method for the production of a sheetlike permeable membrane, wherein a thermosetting resin or a resin capable of being set by light or electron beam is used as the uncoagulated material compatible with or adhesive to the material forming the permeable membrane and the dough of this material is placed in contact with the surface of the permeable membrane and then caused to coagulate by exposure to light or electron beam so as to induce formation of as many minute protuberances on the permeable membrane as the depressions. The term "light" as used in the present specification should be interpreted in a sense so broad as to embrace not merely visible light, ultraviolet light, and infrared radiation but also X ray and γ ray of much shorter wavelengths.

The objects described above are further accomplished by a body fluid filtration apparatus having superposed a plurality of permeable membrane units each composed of a pair of sheetlike permeable membranes vertically separated to form a filtrate flow path therein, sealed along the matched peripheral parts of the permeable membranes, and provided in at least one portion of the permeable membranes with a filtrate outlet, having the superposed permeable membrane units enclosed with a case provided with a body fluid inlet, a body fluid outlet, and a filtrate outlet, and having the filtrate outlets of the permeable membrane units adapted to communicate with the filtrate outlets of the case, which body fluid filtration apparatus is provided with a body fluid route having body fluid flow paths formed one each between the adjacent permeable membrane units and/or filtrate flow paths formed one each inside the individual permeable membrane units by virtue of a plurality of minute protuberances formed on at least one surface of each of the permeable membranes and allowing the body fluid entering the case through the body fluid inlet to advance through the body fluid flow paths, pass through the permeable membranes, and reach the body fluid outlet and a filtrate route allowing the filtrate produced by the body fluid passing through the permeable membranes and entering the permeable membrane units through the medium of the permeable membranes to pass through the filtrate flow paths inside the permeable membrane units and reach the filtrate outlet of the case via the filtrate outlets of the permeable membrane units.

The invention further discloses a body fluid filtration apparatus wherein the height of the minute protuberances of the permeable membranes is in the range of 20 to 200 μm, the diameter of the bases of the minute protuberances is in the range of 100 to 1,000 μm, the distance between the apexes of the minute protuberances is in the range of 300 to 2,000 μm, and the area occupied by the minute protuberances is in the range of 3 to 20%, based on the total area of the membranes. This invention further discloses a body fluid filtration apparatus wherein the permeable membranes are made of a polyolefin.

The objects described above are further accomplished by a body fluid filtration apparatus superposed as separated by an intervening sheetlike flow path regulating member a plurality of permeable membrane units each composed of a filtrate flow path forming member coated on the entire surface thereof with a sheetlike permeable membrane and provided in at least one portion of the permeable membranes with a filtrate outlet, having the superposed permeable membrane units enclosed with a case provided with a body fluid inlet, a body fluid outlet, and a filtrate outlet, and having the filtrate outlets of the permeable membrane units adapted to communicate with the filtrate outlets of the case, which body fluid filtration apparatus is provided with a body fluid route having body fluid flow paths formed one each between the permeable membrane and the sheetlike flow path regulating members by virtue of a plurality of minute protuberances formed on each of the surfaces of the permeable membranes opposed to the sheetlike flow path regulating members, and allowing the body fluid entering the case through the body fluid inlet to advance through the body fluid flow paths, pass through the permeable membranes, and reach the body fluid outlet and a filtrate route allowing the filtrate produced by the body fluid passing through the permeable membranes and entering the permeable membrane units through the medium of the permeable membranes to pass through the filtrate flow paths inside the permeable membrane units and reach the filtrate outlet of the case via the filtrate outlets of the permeable membrane units.

This invention further discloses a body fluid filtration apparatus wherein the height of the minute protuberances of the permeable membranes is in the range of 20 to 200 μm, the diameter of the bases of the minute protuberances is in the range of 100 to 1,000 μm, the distance between the apexes of the minute protuberances is in the range of 300 to 2,000 μm, and the area occupied by the minute protuberances is in the range of 3 to 20%, based on the total area of the membranes. This invention further discloses a body fluid filtration apparatus wherein the Brinnell number of the sheetlike flow path regulating member is not less than 10 and the thickness thereof is in the range of 10 to 200 μm. This invention further discloses a body fluid filtration apparatus wherein the permeable membranes are made of a polyolefin.

[BEST MANNER OF EMBODIMENT OF THE INVENTION]

The sheetlike permeable membrane of this invention is characterized by being provided on at least one surface thereof with a plurality of minute protuberances. When a plurality of such permeable membranes are superposed as in a modular structure, for example, the adjacent permeable membranes are not allowed to contact each other directly but are separated owing to the plurality of minute protuberances occurring on the surfaces of the permeable membranes. Further, since the deformation of the permeable membranes is restricted by the minute protuberances, the distance between the adjacent permeable membranes is always kept constant. When the modular structure is assembled by the use of the plurality of the sheetlike permeable members of this invention as described above, the plurality of minute protuberances formed on the surfaces of the permeable membranes fulfill a part similar to the part of spacers of a jogging surface such as mesh plates or dotted plates and consequently permit stable retention of a proper flow path for a liquid under treatment between the adjacent permeable membranes without requiring the interposition of such spaces of a jogging surface. The existing problem that the modular structure occupies a large space, the process of assembly is complicated, and the priming volume is unduly large owing to the inevitable use of spacers of a jogging surface can be eliminated by the use of the sheetlike permeable membranes of this invention.

A study performed on the ability of filtration which is manifested by such permeable membranes provided with protuberances when they are used in a body fluid filtration apparatus has led to a finding that the formation of a highly uniformized and stabilized body fluid flow path of film is realized and enabled to manifest a distinct ability of body fluid filtration by disposing a rigid sheetlike flow path regulating member on each of the permeable membranes rather than by directly superposing these permeable membranes.

Now, the present invention will be described more specifically below with reference to working examples.

Figure 1A:
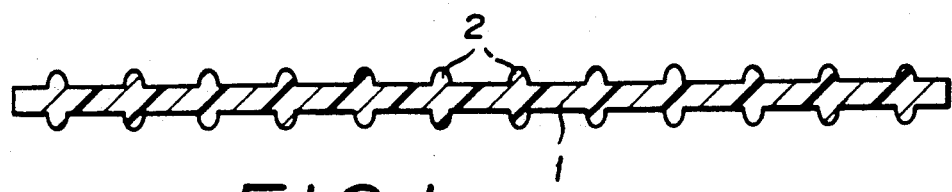
FIGS. 1a to 1d are magnified cross sections illustrating typical sheetlike permeable apparatus to be used in executing the method of this invention for the production of a sheetlike permeable membrane.
Figure 1B:
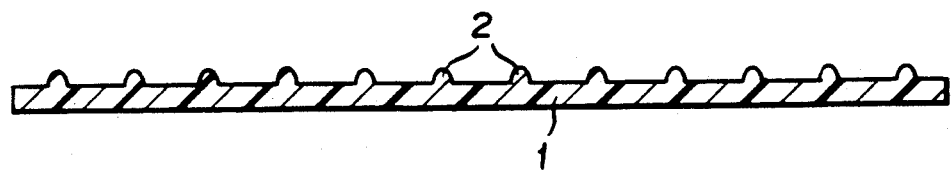
Figure 1C:
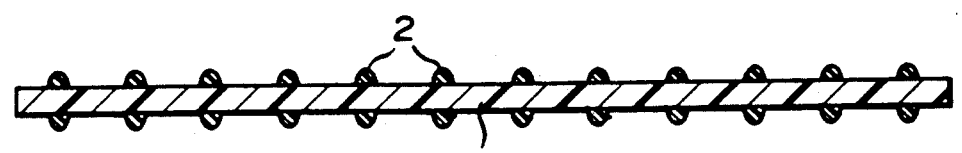
Figure 1D:
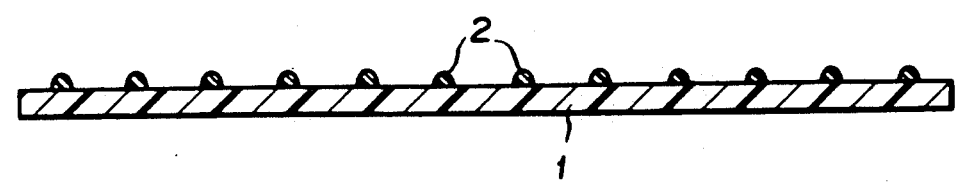

The sheetlike permeable membrane of this invention is characterized by being provided on at least one surface thereof with a plurality of minute protuberances 2 as illustrated in FIGS. 1a to 1b, for example. The sheetlike permeable membrane of this invention may be provided on only one surface with the minute protuberances 2 as illustrated in FIGS. 1b and 1d or on both surfaces as illustrated in FIGS. 1a and 1c. The choice between these two patterns may be changed in accordance with the position for setting the permeable membrane, the purpose of use, etc. The shape in which the minute protuberances 2 are formed is not critical. These minute protuberances may be formed in the shape of dots, lines, or a lattice, for example. These minute protuberances are desired to have a height H in the range of 20 to 1,000 μm, preferably 60 to 200 μm. The area occupied by the portions of the minute protuberances 2 is desired to be in the range of 0.5 to 50%, preferably 1.0 to 20%, based on the area of the surface on which the minute protuberances 2 are formed. If the height H of the minute protuberances 2 is less than 20 μm, the minute protuberances 2 fail to function fully as a spacer and experience difficulty in forming a stable thickness for a flow path. Conversely, if the height H of the minute protuberances 2 exceeds 1,000 μm, the minute protuberances 2 are liable to be deformed so heavily as to entail an error and pose a problem in terms of priming volume. If the area occupied by the portions of the minute protuberances 2 is less than 0.5%, they fail to restrict fully the deformation of the permeable membranes. Conversely, if this area exceeds 50%, there arises the possibility that the area available for filtration is decreased to the extent of preventing the permeable membranes from manifesting the ability of filtration sufficiently.

The portions of minute protuberances 2 on the sheetlike permeable membrane of this invention may be made of the same material as the main body of permeable membrane as illustrated in FIGS. 1a and 1b or of a material different from that of the main body of the permeable membrane as illustrated in FIGS. 1c and 1d. The portions of minute protuberances 2 are desired to be made of a material possessing a Young's modulus in the range of $1.0 \times 10^6$ to $2.0 \times 10^{10}$ dynes/cm$^2$, preferably $1.0 \times 10^6$ to $1.0 \times 10^9$ dynes/cm$^2$. The reason for this specific tensile property is that when such sheetlike permeable membranes are incorporated as superposed in a modular structure, for example, the flow path to be formed by the distance between the adjacent permeable membranes is enabled to be decreased and, in a loose state, allowed to restore spontaneously reversibly by virtue of the tensile property, so as to end ensure desired filtration. Generally, in the superposed type modular structure as described above, the ability of filtration gains in superiority in proportion as the thickness of the flow path for the liquid under treatment decreases. When the thickness of the flow path is changed by the pressure, the desired adjustment of the thickness of the flow path becomes difficult if the portions of the minute protuberances 2 are made of a material possessing a Young's modulus deviating from the aforementioned range. Thus, a possibility ensues that the filtration will not be obtained in a desired amount.

The sheetlike permeable membrane of this invention can be used in a varying manner as in dialysis, ultrafiltration, or precision filtration, for example, depending on the behavior of film of the main body 1 of permeable membrane. It manifests an expecially find quality when it is used as a membrane for blood plasma separation. The fine pores in the sheetlike permeable membrane of this invention have an average diameter approximately in the range of 0.001 to 5 μm.

The material of which the sheetlike permeable membrane of this invention has no particular restriction except for the sole requirement that it should be a macromolecular substance capable of forming a permeable membrane. It may be selected to suit the purpose for which the produced permeable membrane is to be used. When the main body 1 of the permeable membrane and the portions of the minute protuberances 2 are made of one and the same material as illustrated in FIGS. 1a and 1b, the material of a regenerated cellulose type, a cellulose derivative type, a polyvinyl alcohol type, a polysulfone type, a poly(meth)acryl type, a polyamide type, or a polyolefin type may be used, for example. When the sheetlike permeable membrane is intended for use in such a medical apparatus as a blood plasma separation membrane, polypropylene which excels in various physical properties such as permeability, mechanical strength, resistance to heat, and resistance to chemicals and exhibits fair inactivity to blood and other liquids to be treated proves to be a particularly desirable material for the permeable membrane. When the main body 1 of the permeable membrane and the portions of the minute protuberances 2 are made of mutually different materials as illustrated in FIGS. 1c and 1d, the main body 1 of the permeable membrane may be made of the material of a regenerated cellulose type, a cellulose derivative type, a polyvinyl alcohol type, a polysulfone type, a poly(meth)acryl type, a polyamide type, or a polyolefin type and the portions of the minute protuberances 2 may be made of a varying thermosetting resin, a resin capable of being set by heat or electromagnetic wave, or synthetic rubber which is compatible with or adhesive to the material of the main body of the permeable membrane. When the sheetlike permeable membrane is intended for use as a medical apparatus such as a blood plasma separation membrane, for example, the main body 1 of the permeable membrane is desired to be made of polypropylene which excels in various physical properties such as permeability, mechanical strength, resistance to heat, and resistance to chemicals and exhibits fair inactivity to blood and other liquids to be treated and the portions of the minute protuberances 2 to be made of polyurethane, epoxy resin, or an acrylic ester resin which possesses suitable elasticity and exhibits fair inactivity to blood and other liquids to be treated.

The sheetlike permeable membrane possessing the structure as described above can be produced as follows. Specifically, in the production of this permeable membrane by the coagulation of a dope formed in the shape of sheet, this coagulation is allowed to proceed while keeping at least one surface of the sheetlike dope in contact with a mold surface possessed of a plurality of minute depressions thereby induce formation of as many minute protuberances on at least one surface of the permeable membrane as the depressions. This method of production can be employed unconditionally when the main body 1 of the permeable membrane and the portions of the minute protuberances 2 are made of a material which is capable of forming a permeable membrane and further capable of transforming from a fluid state such as a melt or solution to a solid state through a process of coagulation such as solidification by cooling, extraction from solvent, or release from the form of a derivative, for example. The impartation of permeability to the membrane is attained by extraction from solvent, removal of filler, mechanical elongation, etc. The choice among these methods usable for this impartation is not critical. The shape of the mold having at least one surface possessed of a plurality of minute depressions is not critical. A sheetlike mold or a roller mold may be used to suit the process used for the coagulation of the dope. The mold surface possessed of the plurality of minute depressions is copied onto the surface of a permeable membrane which is formed in consequence of the coagulation of the dope. Thus, the permeable membrane is provided on its surface with desired minute protuberances. Depending on the shape of the minute protuberances to be obtained, the mold surface is desired to be such that the depth of the minute depressions is in the range of 20 to 1,000 μm, preferably 60 to 200 μm, and the area to be occupied by the portions of minute depressions is in the range of 0.5 to 50%, preferably 1.0 to 20%, based on the area of the mold surface.

Figure 2:
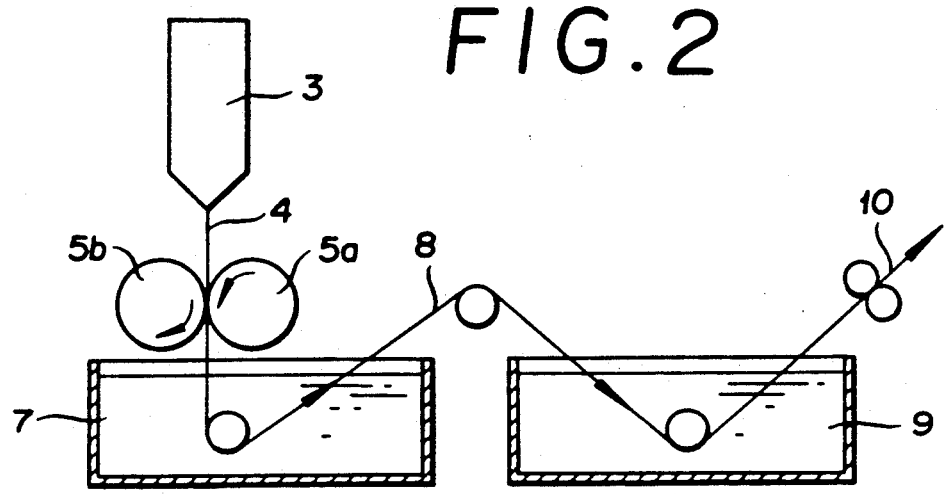
FIG. 2 is a schematic diagram illustrating an apparatus to be used in executing the method of this invention for the production of a sheetlike permeable membrane.
Figure 3:
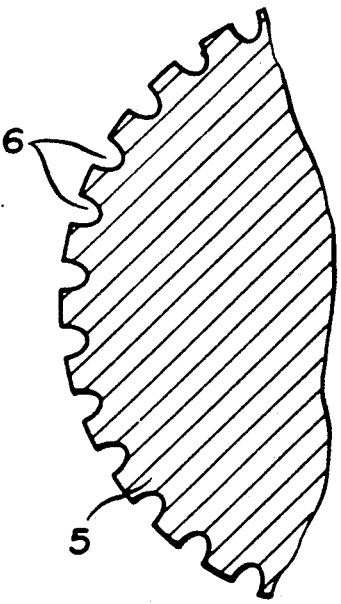
FIG. 3 is a model cross section illustrating the surface contour of a mold roll to be used in executing the method of this invention for the production of a sheetlike permeable membrane.

The method of production of this invention will be described more specifically below with reference to a case of producing a sheetlike permeable membrane using polypropylene as a raw material and resorting to removal of filler for impartation of permeability. Of course, the method of this invention is not limited in any sense to this particular mode of embodiment. First, a composite material prepared by mixing polypropylene, an organic filler capable of being uniformly dispersed in the polypropylene in a molten state and readily soluble in an extractant to be used, and a seed-forming agent is discharged in a molten shape through a T die 3 into a sheetlike shape as illustrated in FIG. 2. A film 4 of dope thus discharged is passed through the opposed surfaces of mold rolls 5a, 5b. The mold rolls 5a, 5b are provided on their surfaces with a plurality of minute depressions 6 as illustrated in FIG. 3. Where the permeable membrane is desired to be provided on only one surface thereof with such minute protuberances 2, however, the film 4 of dope may be passed through the opposed surfaces of a mold roll 5a having a surface possessed of a plurality of minute depressions 6 and a roll having a smooth surface. The film 4 of dope is subsequently brought into contact with a cooling and solidifying liquid 7 to be cooled and coagulated and converted into a coagulated film 8 provided on the surface thereof with a plurality of minute protuberances 2. The coagulated film 8 is then brought into contact with an extractant 9 incapable of dissolving the polyolefin and capable of dissolving the organic filler mentioned above to effect extraction of the organic filler and impartation of permeability and give rise to a sheetlike permeable membrane 20 possessed of minute protuberances 2.

The sheetlike permeable membrane possessing the structure as described above may be otherwise produced by the following method. This method comprises placing in contact with at least one surface of a completed permeable membrane a surface obtained by casting a dope of material compatible with or adhesive to the material of the permeable membrane and possessed of a plurality of minute depressions and then allowing the dope to coagulate thereby inducing formation of as many fine protuberances on at least one surface of the permeable membrane. This method of production can be employed unconditionarily when the main body 1 of the permeable membrane is made of a material capable of forming a permeable membrane and the portions of the minute projections 2 are made of a material which is compatible with or adhesive to the material of the main body 1 of the permeable membrane and further capable of transforming from a fluid state such as a melt or dope to a solid state through a process of coagulation such as solidification by coagulation, application of heat, exposure to light or electron beam, for example. The method and conditions used for the formation of the main body 1 of the permeable membrane are totally irrelevant. It is particularly desirable to use a thermosetting resin or a resin capable of being set by light or electron beam as the material for the formation of the portions of the minute protuberances 2 because the formation of the minute protuberances 2 on the main body 1 of the permeable membrane is easily attained by placing this material in contact with the main body 1 of the permeable membrane and applying heat thereto or exposing it to light or electron beam. The shape of the mold having a surface possessed of the plurality of minute depressions to be used in this method of production is not critical like that in the method of production described above. The mold surface may be the surface of a sheetlike mold or a roller type mold. The minute depressions in the mold surface are provided for the purpose of accomplishing the formation of desired minute protuberances on the surface of the main body 1 of the permeable membrane by causing the dope cast on the surface possessed of the minute depressions to contact the main body 1 of the permeable membrane and then solidifying by coagulation. Depending on the shape of the minute protuberances to be obtained, therefore, the mold surface is desired to be such that the depth of the minute depressions is in the range of 20 to 1,000 μm, preferably 60 to 200 μm, and the area occupied by the portions of the minute depressions is in the range of 0.5 to 50%, preferably 1.0 to 20%, based on the area of the mold surface.

Figure 4:
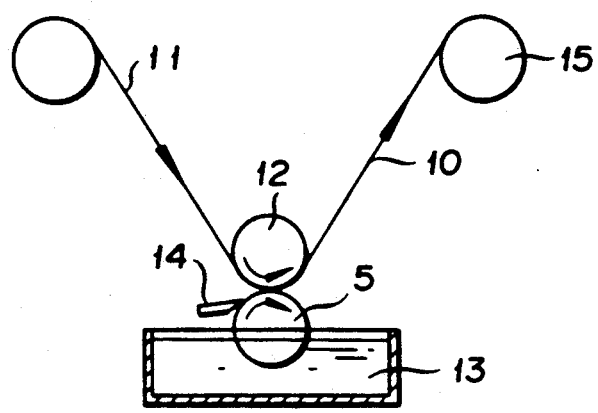
FIG. 4 is a schematic diagram illustrating an apparatus to be used in executing the method of this invention for the production of another sheetlike permeable membrane.

Now, the method of production according with this invention will be described more specifically below with reference to a case of producing a sheetlike permeable membrane by imparting minute protuberances to a complete permeable membrane of polypropylene through the medium of a thermosetting adhesive agent. Of course, the method of this invention is not limited to this particular mode of embodiment. First, a composite material prepared by mixing polypropylene, an organic filler capable of being uniformly dispersing in the polypropylene in its molten state and easily soluble in an extractant to be used, and a seed-forming agent is discharged in a molten state through a T die into a sheetlike state. The film of dope thus discharged is brought into contact with a cooling and coagulating agent to be cooled and solidified. The coagulated film is brought into contact with an extractant incapable of dissolving the polyolefin and capable of dissolving the organic filler to effect extraction of the organic filler and give rise to a flat smooth permeable membrane 11 destined to form the main body 1 of permeable membrane. Then, this flat smooth permeable membrane 11 is passed as illustrated in FIG. 4 between the opposed surfaces of a mold roll 5 provided on the surface thereof with a plurality of minute depressions 6 as illustrated in FIG. 3 and a pinch roll 12. The mold roll 5 is partly immersed in a bath of a thermosetting adhesive agent 13. As the mold roll 5 is rotated, the thermosetting adhesive agent 13 adheres to the surface of the mold roll 5. By a doctor knife 14 disposed as held in contact with the surface of the mold roll 5, the portion of the thermosetting adhesive agent 13 except for the portion lodged in the minute depressions 6 is scraped off. As the result, the mold roll 5 in a state having the thermosetting adhesive agent 13 lodged only in the minute depressions 6 is brought into contact with the flat smooth permeable membrane 11. When the thermosetting adhesive agent 13 is set by suitable heating means (not shown) after this contact is established between the flat smooth permeable membrane 11 and the mold roll 5, the cones of the thermosetting adhesive agent 13 so far held inside the minute depressions 6 of the mold roll 5 are attached fast to the surface of the flat smooth permeable membrane 11 and solidified to form the minute protuberances. The flat sheetlike permeable membrane 10 thus produced as possessed of the minute protuberances is taken up on a takeup roll 15. Of course, the sheetlike permeable membrane 10 provided on both surfaces thereof with a plurality of minute protuberances may be produced by bringing into contact with both surfaces of the flat smooth permeable membrane 11 a mold roll 5 obtained by casting a thermosetting adhesive agent 13 and possessed of a plurality of minute depressions 6.

The sheetlike permeable membrane thus obtained can be used in a varying application as described, depending on the behavior as a film of the main body 1 of the permeable membrane. Such sheetlike permeable membranes manifest a particularly excellent quality when they are incorporated as blood plsma separation membranes, for example, in a modular structure as shown below.

Figure 5:
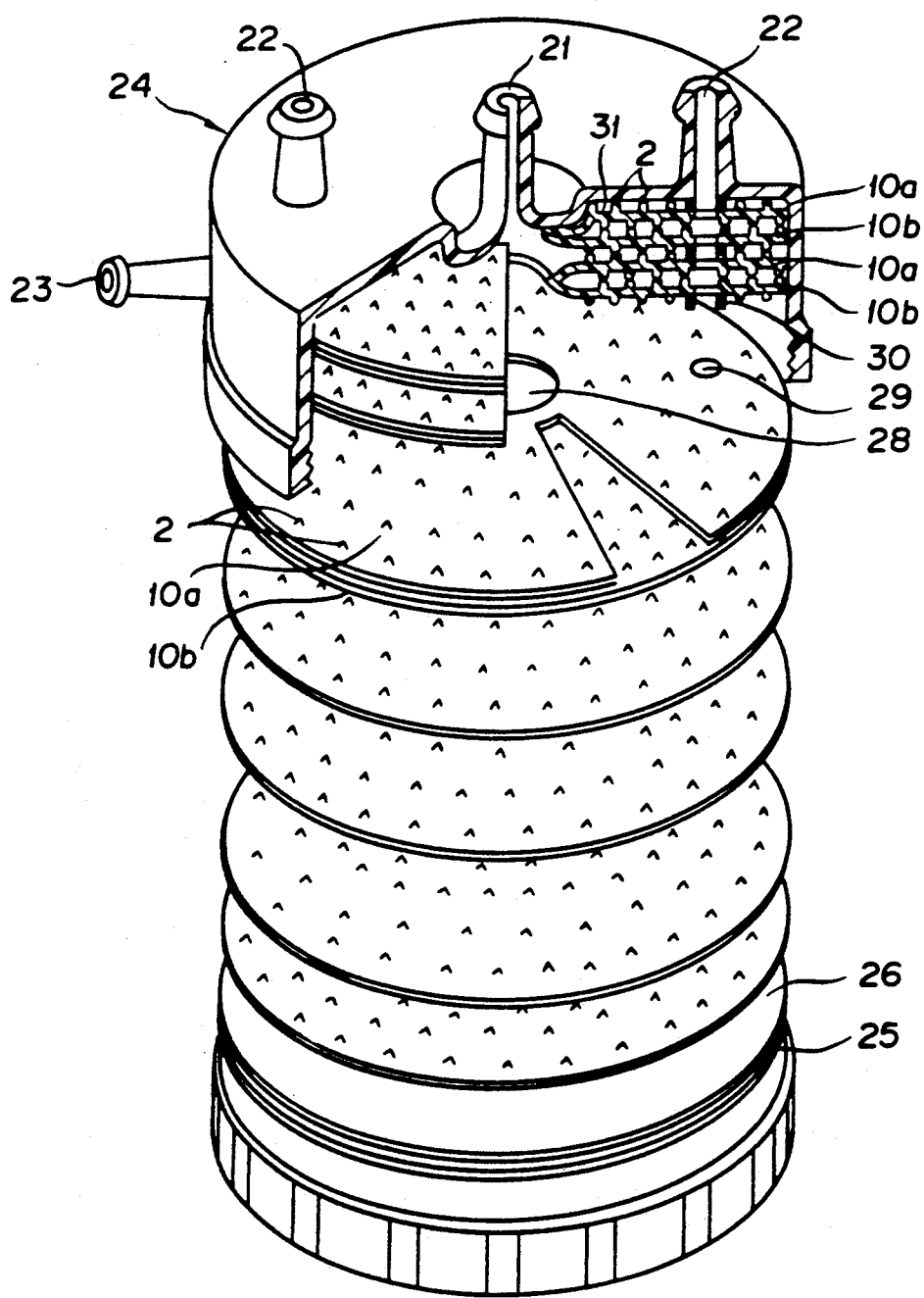
FIG. 5 is an exploded perspective view illustrating a typical body fluid filtration apparatus as one embodiment of this invention.

FIG. 5 illustrates a superposed type blood plasma separation apparatus obtained by the incorporation of sheetlike permeable membranes of this invention. In this blood plasma separation apparatus, a case comprising a cylindrical case proper 24 provided in the central part of the upper plate thereof with a body fluid inlet 21, in the outer peripheral part of the upper plate thereof with a blood plsma outlet 22, and on the lateral wall thereof with a body fluid outlet 23 and a bottom lid member 26 having an O ring 25 attached to the peripheral edge thereof encloses therewith a plurality of superposed permeable membrane units 31 each composed of a pair of sheetlike permeable membranes 10a, 10b of this invention provided on both surfaces thereof with a plurality of minute protuberances 2, vertically superposed, sealed along the matched peripheral edges of the sheetlike permeable membranes and the peripheral edges of central open parts 28, and provided with sealing members 30 attached fast to the outer periphery of a filtrate permeating hole 29. When the sheetlike permeable membranes 10 of this invention are used as described above, the plurality of minute protuberances present on the surfaces of permeable membranes prevent the adjacent main bodies 1 of permeable membranes from directly contacting each other and allow them to be kept apart from each other. Moreover, these minute protuberances 2 permit the distance between the adjacent main bodies of permeable membranes to be kept constant all times. As the result, the body fluid flow paths formed between the adjacent permeable membrane units 31 by the distances of the minute protuberances and the filtrate flow paths formed inside the individual permeable membrane units 31 by the distances of the minute protuberances 1 are retained properly. By the same token, the body fluid flow paths formed by the distances of the minute protuberances 2 between the upper surface of the uppermost of the permeable membrane units 31 and the upper inner surface of the case and between the lower surface of the lowermost of the permeable membrane units 31 and the bottom inner surface of the case are retained properly. When the sheetlike permeable membranes 10a, 10b of this invention are used as described above, the flow path is attained as prescribed without requiring any such spacer as a mesh plate or dotted plate and, as the result, the permeation of a desired substance can be efficiently carried out in a limited space, the process of assembly is simple, and the priming volume is small. In the case of separating blood plasma by the use of this blood plasma separation apparatus, the blood from a human body enters via the body fluid inlet 21, passes through the central open part 18, and passes through the body fluid flow path formed by the distances of the minute protuberances 2 between the permeable membrane units. During this process of flow, the blood is filtered through the sheetlike permeable membranes 10a, 10b of the permeable membrane unit 31. The blood plasma which occurs as a filtrate inside the permeable membrane unit 31 passes through the filtrate passing hole 29 and flows out of the blood plasma outlet 22. In the meantime, the blood which has been filtered is discharged via the body fluid outlet 23.

Figure 6:
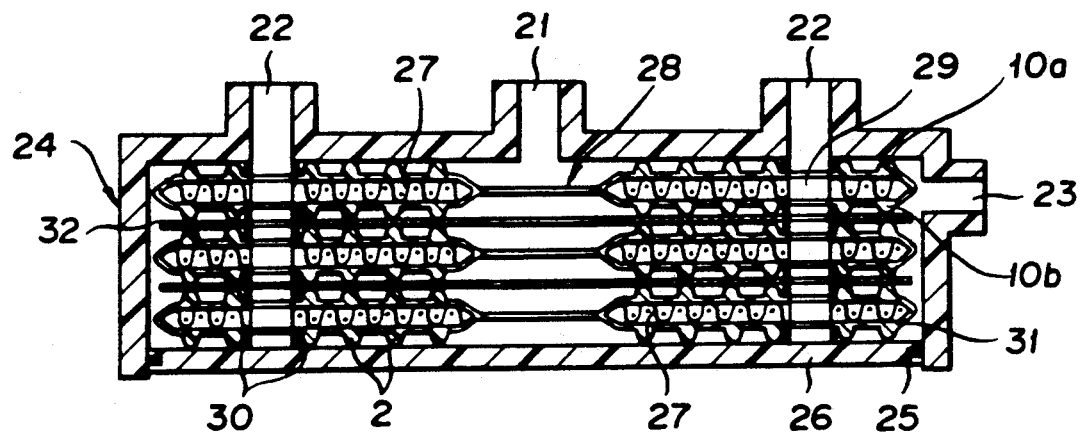
FIG. 6 is a lateral cross section illustrating a typical body fluid filtration apparatus as another embodiment of this invention.

A study performed on the ability of filtration exhibited by the body fluid filtration apparatus using the permeable membranes of this invention provided with minute protuberances has led to a knowledge that a highly uniformized and stabilized body fluid flow path of film possessing a high ability of body fluid filtration can be formed by disposing a rigid sheetlike flow path regulating member on each of the permeable membranes rather than by directly superposing the permeable membranes as in the embodiment illustrated in FIG. 5. FIG. 6 illustrates a preferred embodiment of the body fluid filtration apparatus of this invention based on this knowledge. In this embodiment, a case comprising a cylindrical case proper 24 provided in the central part of the upper plate thereof with a body fluid inlet 21, in the outer peripheral part of the upper plate thereof with a blood plasma outlet 22, and on the lateral wall thereof with a body fluid outlet 23 and a bottom lid member 26 having an O ring 25 attached to the peripheral edge thereof encloses therewith a plurality of membrane units 31 each formed by interposing between a pair of vertically opposed sheetlike permeable membranes 10a, 10b provided on the outer sides thereof with a plurality of minute protuberances 2 a circular fitered body fluid flow path-forming member 27 of screen mesh or nonwoven fabric provided in the center thereof with an open part 28 and near the peripheral part thereof with a filtered body fluid passing hole 29 and sealing the matched peripheral edges of the membranes and the peripheral edge of the central open part and superposed as severally separated by the interposition of a sheetlike flow path regulating member 32 provided with a central open part 28 and a filtrate passing hole 29 correspondingly to the membrane unit and having a seal member 30 attached to the outer periphery of the filtrate passing hole 29. The alternating layers of membrane units 21 and sheetlike flow path regulating members 42 are integrally joined by means of the seal member 30.

In the present embodiment, the minute protuberances 2 present on the outer sides of the sheetlike permeable membranes 10a, 10b cooperate with the sheetlike flow path regulating members 32 opposed to the permeable membranes to support the membranes 10a, 10b in place and prevent them from deformation and allow the body fluid flow path to be formed stably in the gaps between the minute protuberances 2. When the separation of blood plsma is carried out by the use of this blood plasma separation apparatus, the blood from a human body enters via the body fluid inlet 21, passes through the central open part 28, and flows along the body fluid flow path formed by the distances of the minute protuberances 2 between the adjacent permeable membrane units 31, similarly to the embodiment illustrated in FIG. 5. During the process of this flow, the blood is filtered through the sheetlike permeable membranes 10a, 10b of the permeable membrane units 31. The blood plasma occurring as a filtrate inside the permeable membrane units 31 passes through the filtrate passing hole 29 and flows out of the blood plasma outlet 22. In the meantime, the blood which has been filtered is discharged via the body fluid outlet 23.

Figure 7:
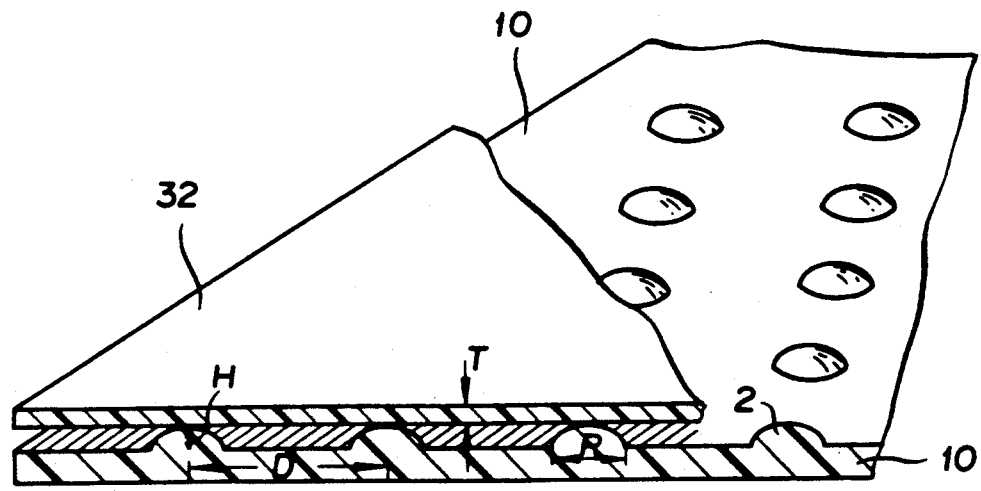
FIG. 7 is a model diagram of a body fluid flow path in the body fluid filtration apparatus of this invention.

When the sheetlike permeable membranes provided with protuberances according with the present invention as described above are used in such a body fluid filtration apparatus as a blood plasma separation apparatus illustrated in FIG. 5 or FIG. 6, the sheetlike permeable membranes provided with the protuberances are desired to satisfy the following restrictive conditions. FIG. 7 is a diagram illustrating in the form of a model the body fluid flow path formed as interposed between a permeable membrane provided with protuberances and a sheetlike flow path regulating member in the embodiment illustrated in FIG. 6.

In the sheetlike permeable membrane provided with the protuberances, the minute protuberances 2 are desired to be such that the height H shown in FIG. 7 is in the range of 20 to 200 μm, the diameter R at the bases in the range of 100 to 1,000 μm, the distance D between the apexes thereof in the range of 300 to 2,000 μm, and the area occupied by the portions of the minute protuberances in the range of 3 to 20%, based on the total area of membrane. Preferably, the height H is in the range of 50 to 100 μm, the diameter R in the range of 200 to 500 μm, the distance D in the range of 500 to 1,000 μm, and the area in the range if 5 to 15%, based on the total area of membrane.

The height of the individual minute protuberances on the surfaces of permeable membrane is an important factor for determining the thickness of the body fluid flow path. From the standpoint of filtration engineering, if the height of the minute protuberances is less than 20 μm, the body fluid flow path has such a small thickness as to entail heavy pressure loss. Conversely, if the height exceeds 200 μm, no sufficient filtration of body fluid is obtained because the shear speed cannot be increased as desired.

For this reason, the height of the minute protuberances is desired to be in the range of 20 to 200 μm. Though this height is desired to be fixed, it may be varied stepwise along the direction of flow of the body fluid.

It has been found that the distance between the individual minute protuberances on the surfaces of the permeable membranes constitutes itself one of the most important factors for the formation of uniform and stable body fluid flow paths. Specifically, if this distance is less than 300 μm, the membrane surface available for filtration is unduly small and the pressure loss is unduly heavy. Conversely, if the distance between the minute protuberances 2 exceeds 2,000 μm, the membranes sustain very slight bends and warps and render difficult the acquisition of uniform and stable body fluid flow paths of satisfactory performance. For this reason, the distance between the minute protuberances is desired to be in the range of 300 to 2,000 μm, preferably 500 to 1,000 μm. The state of distribution of the minute protuberances is desired to be uniform throughout the entire surface of the permeable membranes. It has no particular restriction except for the sole requirement that it should avoid interfering with the uniform flow of the body fluid.

The diameter at the bases of the minute protuberances is desired to be in the range of 100 to 1,000 μm, preferably 200 to 500 μm, because it is difficult to support and form a uniform blood flow path if this diameter is less than 100 μm and the area to be occupied is unduly large if the diameter exceeds 1,000 μm.

Further, the area occupied by the portions of the minute protuberances is desired to be in the range of 3 to 20%, preferably 5 to 15%, based on the area of membrane surface because it is difficult to support and form a perfectly uniform body fluid flow path under harsh conditions if the are is less than 3% and the apparatus requires a large space to offer a sufficient area for filtration if the area exceeds 20%.

The height H, the diameter R at the bases, and the distance D between the apexes are determined by projecting cut specimen of the permeable membrane in 100 magnifications with a projector and the area occupied by the portions of minute protuberances is determined from actually found values.

When sheetlike flow path regulating members 32 are used as interposed between the permeable membrane units 31 as in the embodiment illustrated in FIG. 6, the sheetlike flow path regulating members 4 are desired to be made of a material possessing a Brinnell number of not less than 10 and a thickness T in the range of 10 to 200 μm, preferably 20 to 50 μm.

For the purpose of forming highly uniformized and stabilized body fluid flow paths of film, the sheetlike flow path regulating members are desired to be made of a rigid material. The expression "rigid material" as used herein means a material which sustains substantially no such deformation as dent on contact with the protuberances on the membrane surface and possesses a Brinnell number of not less than 10. The materials which possess Brinnell numbers exceeding this lower limit include polyethylene, polypropylene, polyesters, and polycarbonates, for example.

The Brinnell number herein is determined in accordance with the following formula as specified in Japanese Industrial Standard (JIS) Z 2243.

$$H_B = \frac{2P}{\pi D(D - \sqrt{D^2 - d^2})}$$

wherein $H_B$ stands for Brinnell number (kg/mm$^2$), P for weight of steel ball (kg), D for diameter (mm) of steel ball, and d for diameter (mm) of depression.

The thickness of the sheetlike flow path regulating member is desired to be in the range of 10 to 200 μm, preferably 20 to 50 μm, because a uniform body fluid flow path is supported and formed with difficulty if the thickness is less than 10 μm and the apparatus requires a large space if the thickness exceeds 200 μm.

It has been found that tin the body fluid filtration apparatus of this invention, the other essential requirement for the formation of a highly uniformized and stabilized body fluid flow path is that the permeable membrane units should be free from bends and wrinkles and should retain ample flatness of surface. Specifically, as the material for the permeable membranes, a polyolefin such as polypropylene or polyethylene which has excellent adaptability for body fluid, particularly blood proves to be desirable. Polypropylene is preferred over polyethylene. In the formation of a membrane unit by the union of a pair of permeable membranes made of this material, the heat seal method causes substantially perfect melting of the sealed part of the resin as the material of the permeable membranes and, consequently, entails a dimensional reduction of the sealed part, impairs the flatness of surface of the membrane unit, and fails to impart a sufficient ability of filtration to the produced membrane unit. In contrast, the ultrasonic fusion method only requires to melt only the regions near the contact surfaces of the opposed permeable membranes in imparting sufficient seal strength, allows the produced membrane unit to maintain ample flatness of surface, and consequently permits the membrane unit to manifest an outstanding ability of filtration. Thus, the ultrasonic fusion method is preferred over the heat seal method.

(EXAMPLE)

Now, the present invention will be described more specifically below with reference to working examples.

EXAMPLE 1

By a biaxial extruding machine (produced by Ikegai Iron Works, Ltd.), 100 parts by weight of a mixture of two grades of polypropylene having melt flow indexes (M.I.) of 30 and 0.3 (100:40 in weight ratio), 410 parts by weight of liquid paraffin (number average molecular weight 324) as an organic filler, and 0.36 part by weight of 1,3,2,4-dibenzylidene sorbitol as a crystal seed forming agent were melted and kneaded and pelletized. The resultant pellets were melted at 150° to 200° C. by the same extruding machine and extruded into the ambient air through a T die having a slit width of 0.6 mm. The molded sheet was passed between the opposed surfaces of two mold rolls (chromium-plated rolls measuring 200 mm in diameter and provided with hemispherical depressions 0.25 mm in diameter and 0.15 mm in depth distributed thereon uniformly as separated by a uniform distance to occupy an area of 2%, based on the area of the roll surface), led into a cooling and solidifying liquid of polyethylene glycol to be solidified therein, and then taken up. The film thus taken up was cut to obtain a piece of fixed length (about 200×200 mm). This piece was fixed in position longitudinally and laterally and immersed in 1,1,2-trichloro-1,2,2-trifluoroethane (temperature 25° C.) to deprive the piece of the liquid paraffin by extraction and then heat-treated in the air at 135° C. for two minutes. The permeable membrane consequently obtained turned out to be a sheetlike permeable membrane provided on the surface thereof with minute hemispherical protuberances 0.25 mm in diameter and 0.12 mm in height. Circular pieces measuring 104 mm in outside diameter and containing an open circle 22 mm in diameter were punched out of the permeable membrane. A permeable membrane unit was produced by superposing a pair of such circular pieces and heat sealing their outer peripheral parts and inner peripheral parts. A blood plasma separation apparatus having an available membrane area of 3,500 cm$^2$ was produced by enclosing such permeable membrane units with a cylindrical case as illustrated in FIG. 5. Blood was passed at a flow volume of 100 m./min through this blood plasma separation apparatus to determine the apparatus' ability of filtration. The apparatus was also tested for complement activating component $C_{3a}$. The results were as shown in Table 1.

Determination of Complement Activating Component $C_{3a}$

Figure 8:
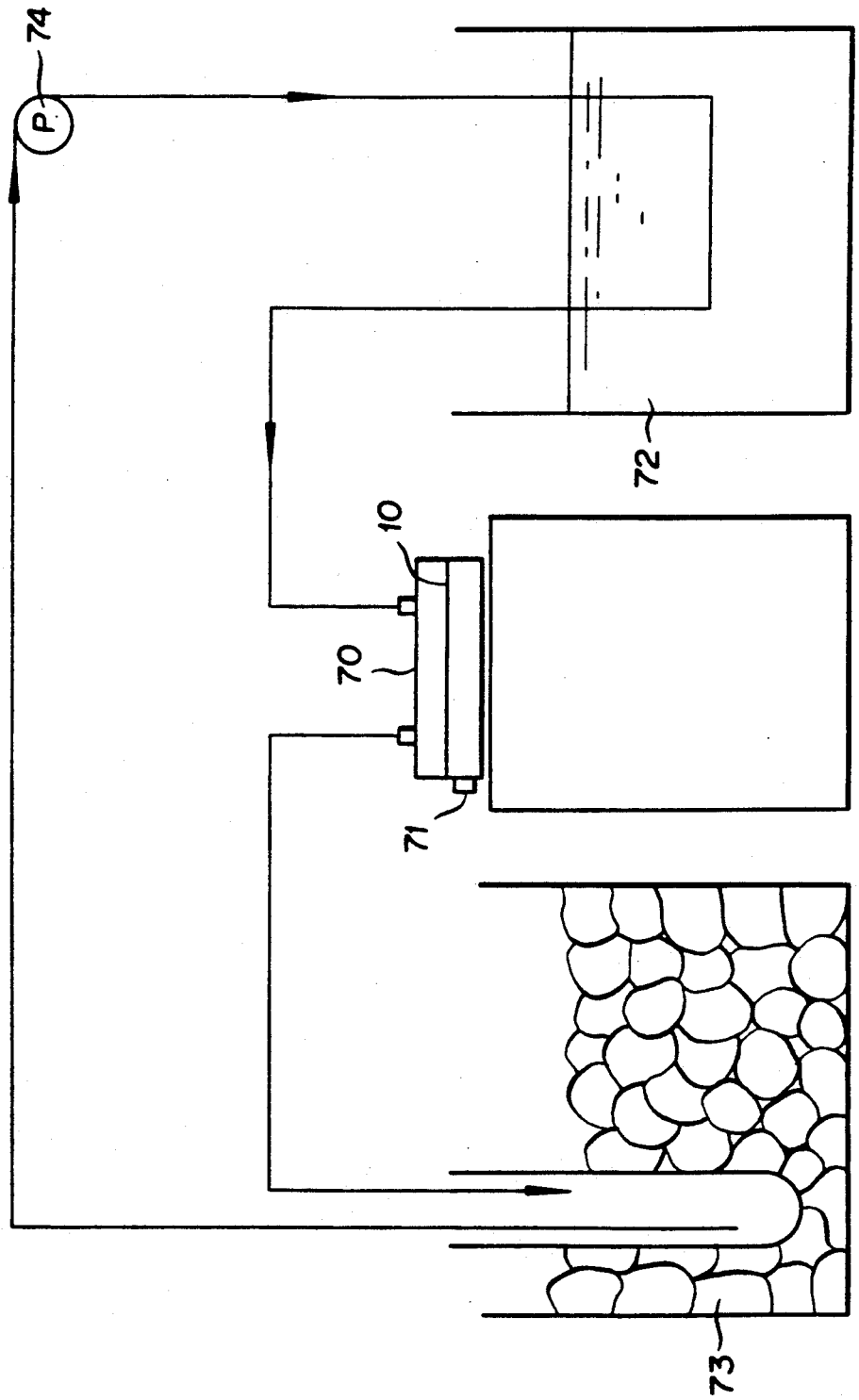
FIG. 8 is a diagram illustrating a circuit used in the determination of a complement activating component $C_{3a}$.
Figure 9:
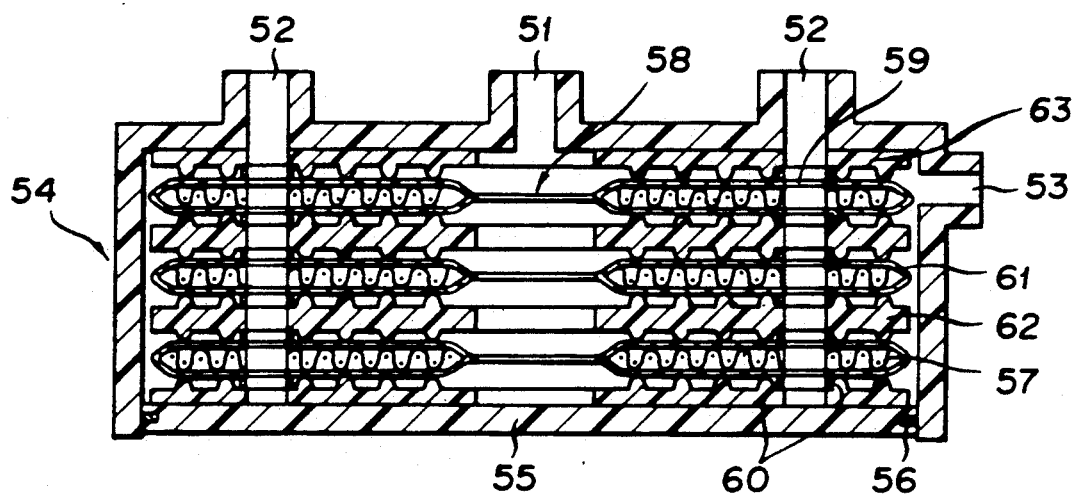
FIG. 9 is a lateral cross section illustrating the structure of a body fluid filtration apparatus cited for comparison.

The blood taken from a healthy normal person was transferred into a glass test tube and heated at 37° C. for 15 minutes for thorough coagulation of the blood and separation of the blood serum. The centrifugal separation was carried out with a cooled centrifuge under the conditions of 4° C., 3,000 rpm, and 20 minutes. The separated blood serum was promptly transferred into ice water. A mini-module 70 incorporated therein the sheetlike permeable membranes 10 obtained as described above and having an available membrane surface of 24 cm$^2$ was set in a circuit illustrated in FIG. 8. By the operation of a circulation pump 74, the blood serum was circulated through the circuit at a flow volume of 5 ml/min. The blood serum emanating through a filtrate outlet 71 was sampled at intervals of 1.5 ml and the samples were tested for $C_{3a}$ concentration by the RIA method. The substance, $C_{3a}$, occurs during the course of activation and is held to serve as a criterion for the degree of activation of complement. In FIG. 8, the reference numeral 72 denotes a heating bath kept at 37° C. and 73 a cooling tank containing ice water.

EXAMPLE 2

By a biaxial extruding machine (produced by Ikegai Iron Works, Ltd.), 100 parts by weight of a mixture of two grades of polypropylene having melt flow indexes of 30 and 0.5 (a mixture of 100:40 by weight ratio), 410 parts by weight of liquid paraffin (number average molecular weight 324) as an organic filler, and 0.36 part by weight of 1,3,2,4-dibenzylidene sorbitol as a crystal seed forming agent were melted and kneaded and pelletized. The pellets were melted by the same extruding machine at 150° to 200° C., extruded into the ambient air through a T die, dropped onto a guide roller in a cooling tank placed directly below the T die, and led into a cooling and solidifying liquid of polyethylene glycol to be solidified therein. The solidified film was immersed in 1,1,2-trichloro-1,2,2-trifluoroethane (25° C.) to be deprived of the liquid paraffin by extraction. It was then heat-treated in the air at 135° C. for two minutes, to obtain a permeable membrane possessing a flat smooth surface. The permeable membrane thus obtained was brought into tight contact with a mold plate (a silicone rubber plate measuring 200×200 mm in area and having hemispherical depression 0.3 mm in diameter and 0.15 mm in depth distributed to occupy an area of 2%, based on the surface area of the mold plate) having a urethane type adhesive agent (produced by Nippon Polyurethane Industry Co., Ltd.) applied in advance to the surface thereof and then scraped with a doctor knife for removal of excess adhesive agent an excess remaining on the surface. After about 20 minutes' tight contact, the permeable membrane was peeled off the mold plate. The membrane thus obtained turned out to be a sheetlike permeable membrane provided on the surface thereof with minute uniformly distributed hemispherical protuberances 0.28 mm in diameter and 0.12 mm in height. A blood plasma separation apparatus was produced by following the procedure of Example 1, excepting such permeable membranes produced as described above were used instead. In the same manner as in Example 1, the blood was passed through the blood plasma separation apparatus to determine the apparatus' ability of filtration. The apparatus was tested for complement activating component $C_{3a}$ in the same manner as in Example 1. The results were as shown in Table 1.

EXAMPLE 3

By a biaxial extruding machine (produced by Ikegai Iron Works, Ltd.), 100 parts by weight of a mixture of two grades of polypropylene having melt flow indexes of 30 and 0.5 (a mixture of 100:40 by weight ratio), 410 parts by weight of liquid paraffin (number average molecular weight 324) as an organic filler, and 0.36 part by weight of 1,3,2,4-dibenzylidene sorbitol as a crystal seed forming agent were melted and kneaded and pelletized. The pellets were melted at 150° to 200° C. by the same extruding machine, extruded through a T die into the ambient air, dropped onto a guide roller in a cooling tank placed directly below the T die, and led into a cooling and solidifying liquid of polyethylene glycol to be solidified therein. The solidified film was immersed in 1,1,2-trichloro-1,2,2-trifluoroethane (25° C.) to be deprived of the liquid paraffin by extraction, and then heat-treated in the air at 135° C. for two minutes, to obtain a permeable membrane possessing a flat smooth surface. To the surface of this permeable membrane, an ultraviolet-setting resin (produced by Dai-nippon Ink & Chemicals, Inc.) was applied by the use of a rotary screen printing machine (produced by Nippon Bunka-Seiko K.K.) incorporating therein a printing plate provided on the surface thereof with holes 0.5 mm in diameter and 0.18 mm in depth distributed to occupy an area of 15% based on the surface area of the plate. Immediately after the application, the applied layer of the resin was exposed for 10 seconds to the ultraviolet light from a 1-kW ultraviolet lamp (produced by Nippon Bunka-Seiko K.K.). The membrane consequently obtained turned out to be a sheetlike permeable membrane provided on the surface thereof with minute uniformly formed spherical protuberances 0.52 mm in diameter and 0.12 mm in height. A blood plasma separation apparatus was produced by following the procedure of Example 1, excepting such permeable membranes produced as described above were used instead. In the same manner as in Example 1, the blood was passed through this blood plasma separation through the blood plasma separation apparatus to determine the apparatus' ability of filtration. The apparatus was tested for complement activating component $C_{3a}$ in the same manner as in Example 1. The results were as shown in Table 1.

Control 1

Figure 11:
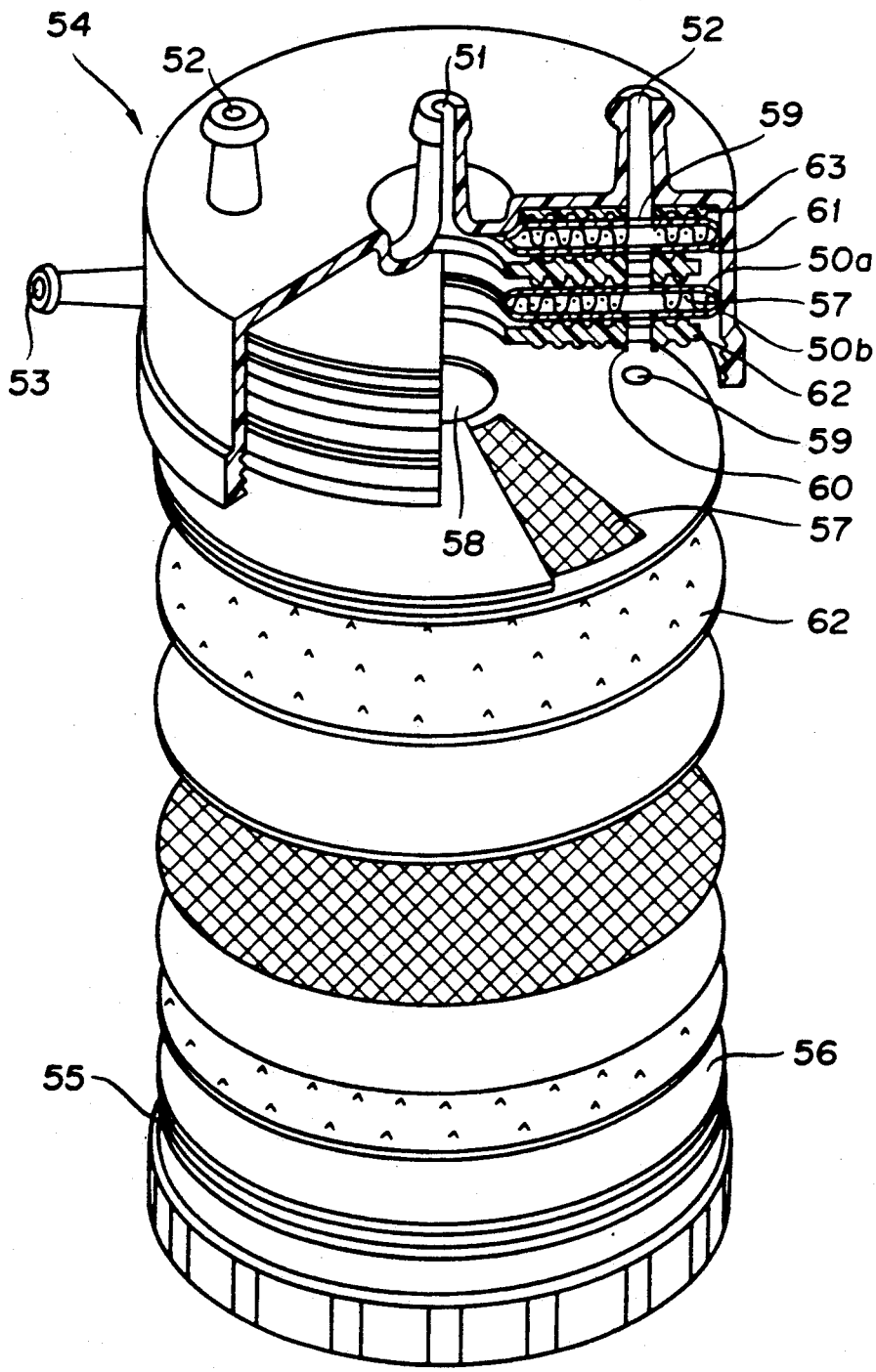
FIG. 11 is an exploded perspective view illustrating a typical conventional body fluid filtration apparatus.
Figure 12:
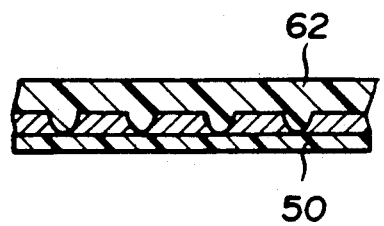
FIG. 12 and FIG. 13 are model cross sections of body fluid flow paths in the conventional body fluid filtration apparatus.
Figure 13:
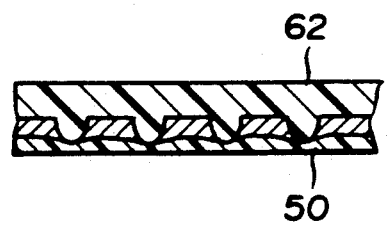

A permeable membrane possessing a flat smooth surface was produced by following the procedure of Example 2. Circular pieces measuring 104 mm in outside diameter and containing a circular open hole 22 mm in diameter were punched out of the permeable membrane. A permeable membrane unit was produced by vertically opposing such circular pieces to each other across two mesh plates of polyester 0.07 mm in linear diameter and 70 mesh in opening ration and intended for the formation of a filtrate flow path. A total of 25 such permeable membrane units and as many ethylene vinyl alcohol sheets (circular pieces measuring 104 mm in outside diameter and containing a circular empty hole 22 in diameter) possessing a thickness of 1 mm and having hemispherical protuberances uniformly formed as a spacer to occupy an area of 2%, based on the surface area were alternately superposed through the medium of a seal member and were enclosed with a cylindrical case as illustrated in FIG. 11, to produce a blood plasma separation apparatus possessing an available membrane surface of 3,500 cm². In the same manner as in Example 1, the blood was passed through the blood plasma separation apparatus to determine the apparatus' ability of filtration. The test for complement activating component $C_{3a}$ was carried out by following the procedure of Example 1, excepting such permeable membranes possessing a flat smooth surface as described above were incorporated in the mini-module. The results were as shown in Table 1.

TABLE 1

| | Priming volume (ml) | Conditions of filtration | | Ability of filtration (ml/min.) | $C_3$ (ng/ml) | | |
| --- | --- | --- | --- | --- | --- | --- | --- |
| | | Flow volume of blood (ml/min.) | Membrane separating pressure (mmHg) | | Inlet | Outlet | Inlet/Outlet |
| Example 1 | 40 | 100 | 40 | 35 | 120 | 168 | 1.4 |
| Example 2 | 40 | 100 | 40 | 34 | 144 | 216 | 1.5 |
| Example 3 | 40 | 100 | 40 | 35 | 130 | 182 | 1.4 |
| Control 1 | 70 | 100 | 40 | 36 | 128 | 320 | 2.5 |

It is clearly noted from the results shown in Table 1 that when sheetlike permeable membranes conforming with this invention (Examples 1 to 3) were used, the ability of filtration was degraded very little and the priming volume was notably decreased and the activation of blood component was conspicuously suppressed as compared with the use of the conventional sheetlike permeable membranes possessing a flat smooth surface (Control 1).

EXAMPLES 4 TO 10

Sheetlike permeable membranes provided with protuberances and used in Examples 4 to 10 were produced by forming on the blood-contacting surface of a flat polypropylene membrane having an average pore diameter of 0.6 μm and a thickness of 130 μm uniform minute protuberances possessing varying height, base diameter, distance, and area of occupation shown in Table 2 by applying to the surface an ultraviolet-setting resin (produced by Dai-Nippon Ink & Chemicals, Inc. and marketed under trademark designation of "DaicureMV") in a prescribed pattern by the use of a screen plate and immediately exposing the applied layer of resin to the ultraviolet light thereby fastening the solidified layer of resin thereto. These permeable membranes provided with the protuberances were each prepared in the form of a circular piece measuring 102 mm in outside diameter and containing a circular open center 22 mm in diameter. As a blood plasma flow path forming member, two screen mesh of polyester possessing a mesh size of 290 μm and a thickness of 135 μm were used in a superposed state. The formation of a permeable membrane unit was attained by vertically opposing a pair of the aforementioned permeable membranes to each other across the two scree meshes and sealing all outer and inner open edges of the superposed layers by the heat seal method (140° C. for two seconds) or the ultrasonic fusion method (an ultrasonic welder, Model 8700, produced by Brunson Inc.). The sheetlike flow path regulating members had an outside diameter of 102 mm and contained an open center 22 mm in diameter. The materials and their Brinnell numbers were as shown in Table 2.

The permeable membrane units and the sheetlike flow path regulating members mentioned above were alternately superposed as illustrated in FIG. 6 with the aid of a hot melt adhesive agent (produced by Toa Gosei Chemical Industry Co., Ltd. and marketed under product code of "PPET-1009") and enclosed with a cylindrical container made of polycarbonate. Then, the bottom lid member of polycarbonate which also functions as a pusher to above piled construction inserted to the bottom open of the container through the medium of an O ring made of silicone rubber, to produce a blood plasma separation apparatus.

Through this apparatus, an anticoagulant (ACD) liquid)-added bovine blood possessing a hematocrit value of 40% and a temperature of 37° C. was passed at a flow volume of 50 ml/min to determine the apparatus' ability of blood plasma filtration, QF. The thickness of the superposed layers (thickness of the apparatus minus the thickness of the cylindrical container and the thickness of the wedges) and the blood side priming volume, PV, were measured as numerical values indicative of the size of apparatus. The results were as shown in Table 2.

Control 2

A permeable membrane used in Control 2 was the same flat membrane of polypropylene possessing an average pore diameter of 0.6 μm and a thickness of 130 μm as used in Examples 4 to 10 and provided with no protuberance. The formation of a permeable membrane unit was accomplished by punching out circular pieces measuring 102 mm in outside diameter and containing a circular open center 22 mm in diameter from the permeable membrane, vertically opposing two such circular pieces to each other across two of the same screen meshes as used in Examples 4 to 10 and sealing all outer and inner open edges of the superposed layers by the ultrasonic fusion method (ultrasonic welder, Model 8700, produced by Brunson).

The permeable membrane units formed of the permeable membranes provided with no protuberance and blood flow path regulating plates made of polypropylene (possessing a height of projected parts 85 μm, a diameter at bases of projected parts 300 μm, a distance between projected parts 750 μm, and a total thickness of 800 μm) were alternately superposed with the aid of the same seal material as used in Examples 4 to 10 and enclosing the superposed layers in a cylindrical container made of polycarbonate. Then, the bottom lid member of polycarbonate which also function as a pusher was inserted to the bottom open part of the container through the medium of an O ring, to produce a blood plasma separation apparatus.

The apparatus thus produced was tested for ability of blood plasma filtration, QF, by following the procedure of Examples 4 to 10. The thickness of the superposed layers and the blood side priming volume, PV, were measured in the same manner as in Examples 4 to 10. The results were as shown in Table 2.

REFERENTIAL EXAMPLE

Figure 10:
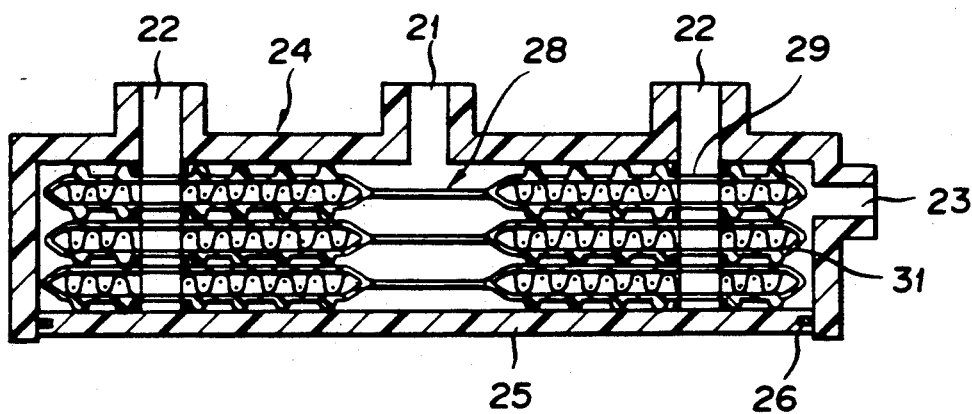
FIG. 10 is a lateral cross section illustrating the structure of a body fluid filtration apparatus cited as a referential example.

In the referential example, a permeable membrane unit was formed by combining a permeable membrane obtained by forming uniform minute protuberances of a height, diameter at bases, a distance and an area of occupation shown in Table 2 on a flat membrane of polypropylene possessing an average pore diameter of 0.6 μm and a thickness of 130 μm in the same manner as in Examples 4 to 10 with a flat membrane of polypropylene possessing an average pore diameter of 0.6 μm and a thickness of 130 μm and provided with no such protuberances. Specifically, the formation of the permeable membrane unit was accomplished by punching out circular pieces measuring 102 mm in outside diameter and containing a central open circle 22 mm in diameter from the permeable membrane provided with protuberances, vertically opposing a pair of such circular pieces to each other across two of the same screen meshes as used in Examples 4 to 10, and sealing all outer and inner open edges of the superposed layers by the ultrasonic fusion method (by the use of an ultrasonic welder, Model 8700, produced by Brunson). Such permeable membrane units obtained as described above were superposed as illustrated in FIG. 10 with the aid of the same seal member and enclosed with a cylindrical container made of polycarbonate. Then, the bottom lid member of polycarbonate which also functions as a pusher inserted to the bottom open part of the container through the medium of an O ring of silicone rubber.

The apparatus thus produced was tested for ability of blood plasma filtration, QF, in the same manner as in Examples 4 to 10 and the thickness of the superposed layers and the blood side priming volume PV, and were measured in the same manner as in Examples 4 to 10. The results were as shown in Table 2.

TABLE 2

| | Kind | Permeable membrane Shape of protuberance | | | | Sheetlike flow path regulating member |
| | | Height H (μm) | Diameter D (μm) | Distance D (μm) | Area occupied (%) | Material (—) |
|---|---|---|---|---|---|---|
| Example 4 | With protuberances | 70 | 300 | 750 | 15 | Polycarbonate |
| Example 5 | With protuberances | 70 | 300 | 750 | 15 | Polycarbonate |
| Example 6 | With protuberances | 70 | 600 | 1500 | 15 | Polycarbonate |
| Example 7 | With protuberances | 70 | 300 | 750 | 15 | Polypropylene, porous |
| Example 8 | With protuberances | 15 | 300 | 750 | 15 | Polycarbonate |
| Example 9 | With protuberances | 70 | 600 | 3000 | 4 | Polycarbonate |

TABLE 2-continued

| | | | | | | |
|---|---|---|---|---|---|---|
| Example 10 | With protuberances** | 70 | 300 | 750 | 15 | Polycarbonate |
| Control 2 | Without protuberances* | — | — | — | — | — |
| Referential Example | With protuberances | 70 | 300 | 750 | 15 | — |

| | Sheetlike flow path regulating member | | Number of layers superposed | Available area of membrane (m$^2$) | Thickness (mm) | PV (ml) | QF (ml/min) |
|---|---|---|---|---|---|---|---|
| | Brinnell number (−) | Thickness (μm) | | | | | |
| Example 4 | 40 | 50 | 11 | 0.11 | 9 | 30 | 20 |
| Example 5 | 40 | 50 | 17 | 0.17 | 13 | 40 | 22 |
| Example 6 | 40 | 50 | 17 | 0.17 | 13 | 40 | 18 |
| Example 7 | 6 | 130 | 17 | 0.17 | 15 | 40 | 15 |
| Example 8 | 40 | 50 | 17 | 0.17 | 13 | 40 | 12 |
| Example 9 | 40 | 50 | 17 | 0.17 | 13 | 40 | 15 |
| Example 10 | 40 | 50 | 17 | 0.17 | 13 | 40 | 12 |
| Control 2 | — | — | 17 | 0.17 | 22 | 50 | 18 |
| Referential Example | — | — | 17 | 0.17 | 10 | 30 | 15 |

*A dotted flow path regulating plate was used.
**Only in Example 10, the superposed layers were joined by the heat seal method. In all the other examples, they were joined by the ultrasonic seal method.

[Economic Utility of the Invention]

As described above, this invention is directed to a sheetlike permeable membrane characterized by being provided on at least one surface thereof with a plurality of minute protuberances. A modular structure incorporating therein such permeable membranes, therefore, permits easy formation of a stable flow path for a liquid given to be treated and has no use for any such spacer as a mesh plate or dotted plate. Thus, the modular structure enjoys a dimensional reduction without a sacrifice of the ability of filtration. Thus, the priming volume can be lowered and the process of assemblage simplified. When this modular structure is used for the treatment of blood as in artificial dialysis, blood plasma separation, or fractionation of blood components, since the sheetlike permeable membrane of this invention has no use for any spacer, the problem of activation of coagulating factors in blood which would otherwise induced by contact with the spacer is precluded.

Further in the sheetlike permeable membrane of this invention, the height of the minute protuberances is in the range of 20 to 1,000 μm and the area occupied by the portions of the minute protuberances is in the range of 0.5 to 50%, based on the area of the surface containing the minute protuberances. The portions of the minute protuberances are made of a material possessing a Young's modulus in the range of $1.0 \times 10^6$ to $2.0 \times 10^{10}$ dynes/cm$^2$. Where the main body of the permeable membrane and the portions of the minute protuberances are to be made of one and the same material, the material is desired to be a macromolecular substance selected from the group consisting of regenerated cellulose type, cellulose derivative type, polyvinyl alcohol type, polysulfone type, poly(meth)acryl type, polyamide type, and polyolefin type substances. Polypropylene is the most desirable material. Where the main body of the permeable membrane and the portions of the minute protuberances are to be made of mutually different materials, specifically when the main body of the permeable membrane is made of a macromolecular substance selected from the group consisting of regenerated cellulose type, cellulose derivative type, polyvinyl alcohol type, polysulfone type, poly(meth)acryl type, polyamide type, and polyolefin type substances, preferably polypropylene and the portions of the minute protuberances are made of a thermoplastic resin, a resin capable of being set by heat or electromagnetic wave, or a synthetic rubber compatible with or adhesive to the material forming the main body of the permeable membrane, preferably polyurethane, an epoxy resin, or an acrylic ester resin, the aforementioned desirable properties are manifested to better advantage.

This invention further is directed to a method for the production of a sheetlike permeable membrane by the coagulation of a dope formed in the shape of sheet, which method is characterized by causing the coagulation to proceed while keeping in contact with at least one surface of the sheetlike dope a mold surface possessing a plurality of minute depression thereby inducing the formation of a plurality of minute protuberances on at least one surface of the produced permeable membrane. The sheetlike permeable membrane possessing the highly desirable structure as described above can be formed easily. Where the mold to be used is such that the depth of the minute depressions is in the range of 20 to 1,000 μm and the area occupied by the portions of the minute depressions is in the range of 0.5 to 50%, based on the area of the mold surface and where the mold surface possessing the plurality of minute depressions is a roller surface, the sheetlike permeable membrane possessing still better quality can be easily produced. Further, this invention is directed to a method for the production of a sheetlike permeable membrane, characterized by placing in contact with at least one surface of a completed permeable membrane a mold surface obtained by casting a cope of a material compatible with or adhesive to The material forming the permeable membrane and possessing a plurality of minute depressions and setting the dope thereby inducing the formation of a plurality of minute protuberances on at least one surface of the produced permeable membrane. Thus, the sheetlike permeable membrane possessing the highly desirable structure described above can be formed easily. When the mold to be used is such that the depth of the minute depressions is in the range of 20 to 1,000 μm and the area occupied by the portions of the minute depressions is in the range of 0.5 to 50%, based on the area of the mold surface and a resin material capable of being set by heat or electromagnetic wave is used as the dope of material compatible with or adhesive to the material forming the permeable membrane, placed in contact with the surface of the permeable membrane, and solidified by application of heat or exposure to electromagnetic wave to induce the formation of minute protuberances on the permeable membrane, the sheetlike permeable membrane possessing the highly desirable structure described above can be obtained more easily.

This invention is further directed to a body fluid filtration apparatus having superposed a plurality of permeable membrane units each composed of a pair of sheetlike permeable membranes vertically separated to form a filtrate flow path therein, sealed along the matched peripheral parts of the permeable membranes, and provided in at least one portion of the permeable membranes, and provided in at least one portion of the permeable membranes with a filtrate outlet, having the superposed permeable membrane units enclosed with a case provided with a body fluid inlet, a body fluid outlet, and a filtrate outlet, and having the filtrate outlets of the permeable membrane units adapted to communicate with the filtrate outlets of the case, which body fluid filtration apparatus is provided with a body fluid route having body fluid flow paths formed one each between the adjacent permeable membrane units and/or filtrate flow paths formed one each inside the individual permeable membrane units by virtue of a plurality of minute protuberances formed on at least one surface of each of the permeable membranes and allowing the body fluid entering the case through the body fluid inlet to advance through the body fluid flow paths, pass through the permeable membranes, and reach the body fluid outlet and a filtrate route allowing the filtrate produced by the body fluid passing through the permeable membranes and entering the permeable membrane units through the medium of the permeable membranes to pass through the filtrate flow paths inside the permeable membrane units and reach the filtrate outlet of the case via the filtrate outlets of the permeable membrane units. Thus, the characteristic quality of the sheetlike permeable membrane provided with protuberances can be utilized fully, the modular structure using such permeable membranes can be dimensionally decreased with a sacrifice of the ability of filtration, the priming volume can be lowered, and the technique of body fluid separation can be advanced notably. This body fluid separation apparatus is enabled to acquire a distinct ability of filtration infallibly when the permeable membrane is such that the height of the minute protuberances is in the range of 20 to 200 $\mu$m, the diameter at bases of these minute protuberances is in the range of 100 to 1,000 $\mu$m, the distance between the apexes of the minute protuberances is in the range of 300 to 2,000 $\mu$m, and the area occupied by the minute protuberances is in the range of 3 to 20%, based on the total area of the membrane surface and when the permeable membrane is made of a polyolefin.

This invention is also directed to a body fluid filtration apparatus having superposed as separated by an intervening sheetlike flow path regulating member a plurality of permeable membrane units each composed of a filtrate flow path forming member coated on the entire surface thereof with a sheetlike permeable membrane and provided in at least one portion of the permeable membranes with a filtrate outlet, having the superposed premeable membrane units enclosed with a case provided with a body fluid inlet, a body fluid outlet, and a filtrate outlet, and having the filtrate outlets of the permeable membrane units adapted to communicate with the filtrate outlets of the case, which body fluid filtration apparatus is provided with a body fluid route having body fluid flow paths formed one each between the permeable membranes and the sheetlike flow path regulating members by virtue of a plurality of minute protuberances formed on each of the surfaces of the permeable membranes opposed to the sheetlike flow path regulating members, and allowing the body fluid entering the case through the body fluid inlet to advance through the body fluid flow paths, pass through the permeable membranes, and reach the body fluid outlet and a filtrate route allowing the filtrate produced by the body fluid passing through the permeable membranes and entering the permeable membrane units through the medium of the permeable membranes to pass through the filtrate flow paths inside the permeable membrane units and reach the filtrate outlet of the case via the filtrate outlets of the permeable membrane units. Thus, this apparatus permits ample dimensional reduction, enables formation of a highly uniformized and stabilized body flow path of film, and warrants manifestation of a high ability of filtration.

What is claimed is:

1. A body fluid filtration apparatus comprising a plurality of superposed permeable membrane units each composed of a pair of sheetlike permeable membranes vertically separated to form a filtrate flow path therein, sealed along the matched peripheral parts of said permeable membranes, and provided in at least one portion of said permeable membranes with a filtrate outlet, having said superposed permeable membrane units enclosed with a case provided with a body fluid inlet, a body fluid outlet, and a filtrate outlet, and having said filtrate outlets of said permeable membrane units adapted to communicate with said filtrate outlets of said case, said permeable membranes have on at least one surface thereof a plurality of minute protuberances which are made of a resin having properties for enabling said protuberances to be set by heat, light or electron beam and compatible with or adhesive to the material of said permeable membrane, and said body fluid filtration apparatus is provided with a body fluid route having body fluid flow paths formed between the adjacent permeable membrane units and filtrate flow paths formed inside the individual permeable membrane units by virtue of said minute protuberances formed on at least one surface of each of said permeable membranes for allowing the body fluid entering said case through said body fluid inlet to advance through said body fluid flow paths, pass through the permeable membranes, and to reach said body fluid outlet and also provided with a filtrate route for allowing the filtrate produced by the body fluid passing through the permeable membranes and entering said permeable membrane units through the medium of said permeable membranes to pass through said filtrate flow paths inside said permeable membrane units to reach said filtrate outlet of said case via said filtrate outlets of said permeable membrane units.

2. A body fluid filtration apparatus according to claim 1, wherein the height of said minute protuberances is in the range of 20 to 200 $\mu$m, the diameter of the bases of said minute protuberances is in the range of 100 to 1,000 $\mu$m, the distance between the apexes of said minute protuberances is in the range of 300 to 2,000 $\mu$m, and the area occupied by the portions of said minute protuberances is in the range of 3 to 20%, based on the total area of said permeable membrane.

3. A body fluid filtration apparatus according to claim 1, wherein said permeable membranes is made of a polyolefin.

4. A body fluid filtration apparatus comprising:
a plurality of permeable superposed membrane units separated by an intervening sheetlike flow path, said membrane units being composed of a filtrate flow path forming member coated on the entire surface thereof with a sheetlike permeable membrane and provided in at least one portion of said permeable membranes with a filtrate outlet, having said superposed permeable membrane units enclosed with a case provided with a body fluid inlet, a body fluid outlet, and a filtrate outlet, and having said filtrate outlets of said permeable membrane units adapted to communicate with said filtrate outlets of said case, which body fluid filtration apparatus is provided with a body fluid route having body fluid flow paths formed one each between said permeable membranes and said sheetlike flow path regulating members by virtue of a plurality of minute protuberances formed on each of the surfaces of said permeable membranes opposed to said sheetlike flow path regulating members, and means for allowing the body fluid entering said case through said body fluid inlet to advance through said body fluid flow paths, pass through said permeable membranes, and for reaching said body fluid outlet and a filtrate route allowing the filtrate produced by the body fluid passing through said permeable membranes and entering said permeable membrane units through the medium of said permeable membranes to pass through said filtrate flow paths inside said permeable membrane units and to reach said filtrate outlet of said case via said filtrate outlets of said permeable membrane units.

5. A body fluid filtration apparatus according to claim 4, wherein the height of said minute protuberances is in the range of 20 to 200 μm, the diameter of the bases of said minute protuberances is in the range of 100 to 1,000 μm, the distance between the apexes of said minute protuberances is in the range of 300 to 2,000 μm, and the area occupied by the portions of said minute protuberances is in the range of 3 to 20%, based on the total area of said permeable membrane.

6. A body fluid filtration apparatus according to claim 4, wherein the Brinnel number of said sheetlike flow path regulating members is not less than 10 and the thickness thereof is in the range of 10 to 200 μm.

7. A body fluid filtration apparatus according to claim 4, wherein said permeable membranes is made of a polyolefin.

8. A filtration apparatus, comprising:
a case having a fluid inlet, a fluid outlet, and a filtrate outlet;
at least two sheetlike permeable membranes arranged inside the case, each membrane having an open part and at least one having a filtrate permeating hole, wherein said membranes are sealed in a unit along their matched peripheral edges and along a peripheral edge of the open part;
a plurality of protuberances arranged on at least a surface of each of the permeable membranes; and
a sealing member arranged at an outer periphery of each of said filtrate permeating holes for guiding filtrate from inside said permeable membrane unit to said filtrate outlet.

9. A filtration apparatus as claimed in claim 8 wherein said permeable membranes are made of polyolefin.

10. A filtration apparatus as claimed in claim 9 wherein said protuberances on adjacent permeable membranes are coaxially aligned.

11. A filtration apparatus as claimed in claim 8 wherein said plurality of protuberances is arranged on both surfaces of each of said permeable membranes.

12. A filtration apparatus as claimed in claim 8 wherein said protuberances are formed from a resin which may be set by heat, light, or electron beam.

13. A filtration apparatus as claimed in claim 8 wherein said protuberances are 20 to 200 micrometers tall.

14. A filtration apparatus as claimed in claim 8 wherein a diameter at the base of said protuberances is in the range of 100 to 1000 micrometers.

15. A filtration apparatus as claimed in claim 8 wherein a distance between the apexes of said protuberances is in the range of 300 to 2000 micrometers.

16. A filtration apparatus as claimed in claim 8 wherein said protuberances occupy in the range of 3 to 20% of the surface area of said permeable membrane.

17. A fluid filtration apparatus comprising:
a case having a fluid inlet, a fluid outlet, and a filtrate outlet;
at least two sheetlike permeable membranes arranged inside the case, each permeable membrane having an open part for receiving fluid from the fluid inlet and at least one permeable membrane having a filtrate permeating hole for guiding filtrate to said filtrate outlet, wherein said membranes are sealed in a unit along their matched peripheral edges and also sealed along the peripheral edges of the open part;
a path forming member sandwiched between said permeable membranes;
a plurality of protuberances arranged on an outside surface of said permeable membrane unit; and
a sealing member arranged at an outer periphery of each of said filtrate permeating holes for guiding filtrate from inside said sealed permeable membrane unit to said filtrate outlet.

18. A fluid filtration apparatus as claimed in claim 17 wherein said permeable membranes are made of polyolefin.

19. A fluid filtration apparatus as claimed in claim 17 wherein said protuberances on adjacent permeable membranes are coaxially aligned.

20. A fluid filtration apparatus as claimed in claim 17 wherein said protuberances are formed from a resin which may be set by heat, light, or electron beam.

21. A fluid filtration apparatus as claimed in claim 17 wherein said protuberances are 20 to 200 micrometers tall.

22. A fluid filtration apparatus as claimed in claim 17 wherein a diameter at the base of said protuberances is n the range of 100 to 1000 micrometers.

23. A fluid filtration apparatus as claimed in claim 17 wherein a distance between the apexes of said protuberances is in the range of 300 to 2000 micrometers.

24. A fluid filtration apparatus as claimed in claim 17 wherein said protuberances occupy in the range of 3 to 20% of the surface area of said permeable membrane.

25. A fluid filtration device as claimed in claim 17 wherein said path forming member has another filtrate permeating hole arranged to communicate with said filtrate permeating hole in said permeable membrane unit.

26. A fluid filtration device as claimed in claim 17 further comprising:
a sheetlike flow path regulating member arranged inside said case to contact some of said protuberances, said flow path regulating member having another filtrate permeating hole arranged to communicate with said filtrate permeating hole in said permeable membrane unit; and
another sealing member arranged at an outer periphery of the filtrate permeating hole in said flow path regulating member for guiding filtrate from inside said sealed permeable membrane unit.

27. A fluid filtration device as claimed in claim 26 wherein said flow path regulating members are made of a rigid material.

28. A fluid filtration device as claimed in claim 26 wherein a Brinnel number of said flow path regulating member is greater than 10.

29. A fluid filtration device as claimed in claim 26 wherein said flow path regulating member has a thickness in the range of 10 to 200 micrometers.

* * * * *